US011815921B2

(12) United States Patent
Driscoll et al.

(10) Patent No.: US 11,815,921 B2
(45) Date of Patent: Nov. 14, 2023

(54) AUTOMATED SWIMMING POOL HEAT PUMP FLOW RATE CONTROLLER

(71) Applicant: AquaCal AutoPilot, Inc., St Petersburg, FL (US)

(72) Inventors: Thomas P. Driscoll, St. Petersburg, FL (US); Jeffrey Tawney, St. Petersburg, FL (US); Stanford P. Hudson, St. Petersburg, FL (US); Michael Krasowski, St. Petersburg, FL (US)

(73) Assignee: AquaCal AutoPilot, Inc., St. Petersburg, FL (US)

( * ) Notice: Subject to any disclaimer, the term of this patent is extended or adjusted under 35 U.S.C. 154(b) by 0 days.

(21) Appl. No.: 17/512,324

(22) Filed: Oct. 27, 2021

(65) Prior Publication Data

US 2023/0127979 A1   Apr. 27, 2023

(51) Int. Cl.
| | |
|---|---|
| *G05D 7/06* | (2006.01) |
| *G05D 23/19* | (2006.01) |
| *E04H 4/12* | (2006.01) |
| *G05B 11/01* | (2006.01) |
| *G05B 19/43* | (2006.01) |

(52) U.S. Cl.
CPC ............ *G05D 7/0623* (2013.01); *E04H 4/129* (2013.01); *G05B 11/011* (2013.01); *G05B 19/43* (2013.01); *G05D 23/193* (2013.01)

(58) Field of Classification Search
CPC ........ G05B 19/43; G05B 19/02; G05B 11/011; G05D 7/0623; G05D 23/193; E04H 4/129
See application file for complete search history.

(56) References Cited

U.S. PATENT DOCUMENTS

| | | | |
|---|---|---|---|
| 3,786,921 | A | 1/1974 | Johnson |
| 4,322,297 | A | 3/1982 | Bajka |
| 4,621,613 | A | 11/1986 | Krumhansl |

(Continued)

FOREIGN PATENT DOCUMENTS

| | | |
|---|---|---|
| WO | 0151739 A1 | 7/2001 |
| WO | 2022155940 | 7/2022 |

OTHER PUBLICATIONS

WIKIPEDIA; "Heat pump"; retrieved on Feb. 7, 2023 from https://en.wikipedia.org.
GOOGLE PATENTS; "2022155940 Water temperature control method for swimming pool heat pump system, apparatus, device, and storage medium"; machine translation retrieved on Jan. 9, 2023 from https://patents.google.com.
AIRCAL; "Why Are So Many People Using Variable Frequency Air Source Heat Pumps?", retrieved on Jan. 9, 2023 from https://wwwaircalheatpump.com.

(Continued)

*Primary Examiner* — Michael D Masinick
*Assistant Examiner* — Christopher W Carter
(74) *Attorney, Agent, or Firm* — Robert H. Frantz

(57) ABSTRACT

A flow rate component, such as a bypass valve with a motorized actuator, a variable speed circulation pump, or both, is controlled in realtime by an automatic controlled to regulate water flow rate through a swimming pool heater, such as a heat pump, to optimize heat transfer, minimize energy consumption, and improve life spans of components of the swimming pool circulation, filtering and heating system.

17 Claims, 6 Drawing Sheets

(56) References Cited

U.S. PATENT DOCUMENTS

| | | | |
|---|---|---|---|
| 5,415,221 A | 5/1995 | Zakryk | |
| 5,809,796 A | 9/1998 | Zakryk | |
| 6,109,050 A | 8/2000 | Zakryk | |
| 6,407,469 B1 | 6/2002 | Cline et al. | |
| 6,695,970 B2 | 2/2004 | Hornsby | |
| 10,801,225 B1* | 10/2020 | Reddy et al. | C02F 1/46104 |
| 2002/0000007 A1 | 1/2002 | Pittman | |
| 2002/0050490 A1 | 5/2002 | Pittman et al. | |
| 2004/0004034 A1 | 1/2004 | Hornsby | |
| 2013/0118705 A1* | 5/2013 | Potter | E04H 4/129 |
| | | | 165/104.11 |
| 2019/0018377 A1 | 1/2019 | Potucek et al. | |

OTHER PUBLICATIONS

ANSI/AHRI, "2014 Standard for Performance Rating of Heat Pump Pool Heaters", retrieved on Jan. 9, 2023 from https://www.ahrinet.org/sites/default/files/2022-06/ANSI_AHRI_Standard_1160_1-P_2014_with_Addendum_1_0.pdf.

AQUACAL AUTOPILOT; "Poolsync WiFi Controller"; retrieved on Sep. 7, 2021 from https://www.aquaal.com.

AQUACAL AUTOPILOT; "Tropical Swimming Pool Heat Pump"; retrieved on Sep. 7, 2021 from https://www.aquaal.com.

Cho et al.; "Measurement and Evaluation of Heating Performance of Heat Pump Systems Using Wasted Heat from Electric Devices for an Electric Bus", Mar. 8, 2021, Energies 210, vol. 5, pages 658 - 669.

HAMPTON, Rob; "What is a Bypass Valve on a Swimming Pool Heater for?", retrieved on Oct. 27, 2021 from https://dengarden.com.

HEATPUMPS4POOLS.COM; "2" Bypass Kit for Heat Pumps (White)"; retrieved on Oct. 27, 2021 from https://heatpumps4pools.com.

JANDY; "JVA 2444 Valve Actuator", retrieved on Sep. 7, 2021 from https://www.jancy.com.

Liu Zhili, Water Temperature Control Method for Swimming Pool Heat Pump System, Apparatus, Device, and Storage Medium (WO2022155940 A1 Translation), Jan. 25, 2021, ip.com Machine Translation (Year: 2021).*

Picard et al.; "Analytical Solution for Optimal Mass Flow Rate in Primary Circuit of Ground-Coupled Heat Pump Systems", IGSHPA Technical/Research Conference and Expo, Mar. 14-16, 2017.

* cited by examiner

AUTOMATED SWIMMING POOL HEAT PUMP FLOW RATE CONTROLLER

FIELD OF THE INVENTION

The present invention relates to systems and methods for controlling flow of water through a heat pump, such as but not limited to a swimming pool heat pump, and for optimizing heat transfer and filter operation.

BACKGROUND OF INVENTION

Modern plumbing layouts for swimming pool heat pumps include a bypass to limit the amount of water flow through the heater. The bypass includes plumbing and a variable opening valve which allows some amount of water to divert around the heat pump rather than flow through the heat pump. How much water actually takes the bypass instead of the path through the heat pump depends on the resistance of the water flow through the heat pump relative to the amount that the bypass valve is open or closed.

Getting the right valve setting for the specific swimming pool plumbing layout, pump speed, and heater characteristics is typically done empirically. Installers and homeowners must manually change the valve setting to control the flow rate through the heater. If the flow rate is too high the increased pressure drop through the heater will increase the energy use required by the circulation pump and increase the rate of wear on the pump. If the flow rate is too low the performance and efficiency of the heat pump will be adversely affected and lead to reliability issues.

SUMMARY OF THE EXEMPLARY EMBODIMENTS OF THE INVENTION

A flow rate component, such as a bypass valve with a motorized actuator, a variable speed circulation pump, or both, is controlled in realtime by an automatic controlled to regulate water flow rate through a swimming pool heater, such as a heat pump, to optimize heat transfer, minimize energy consumption, and improve life spans of components of the swimming pool circulation, filtering and heating system.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF ONE OR MORE EXEMPLARY EMBODIMENT(S) OF THE INVENTION

Figure 1:
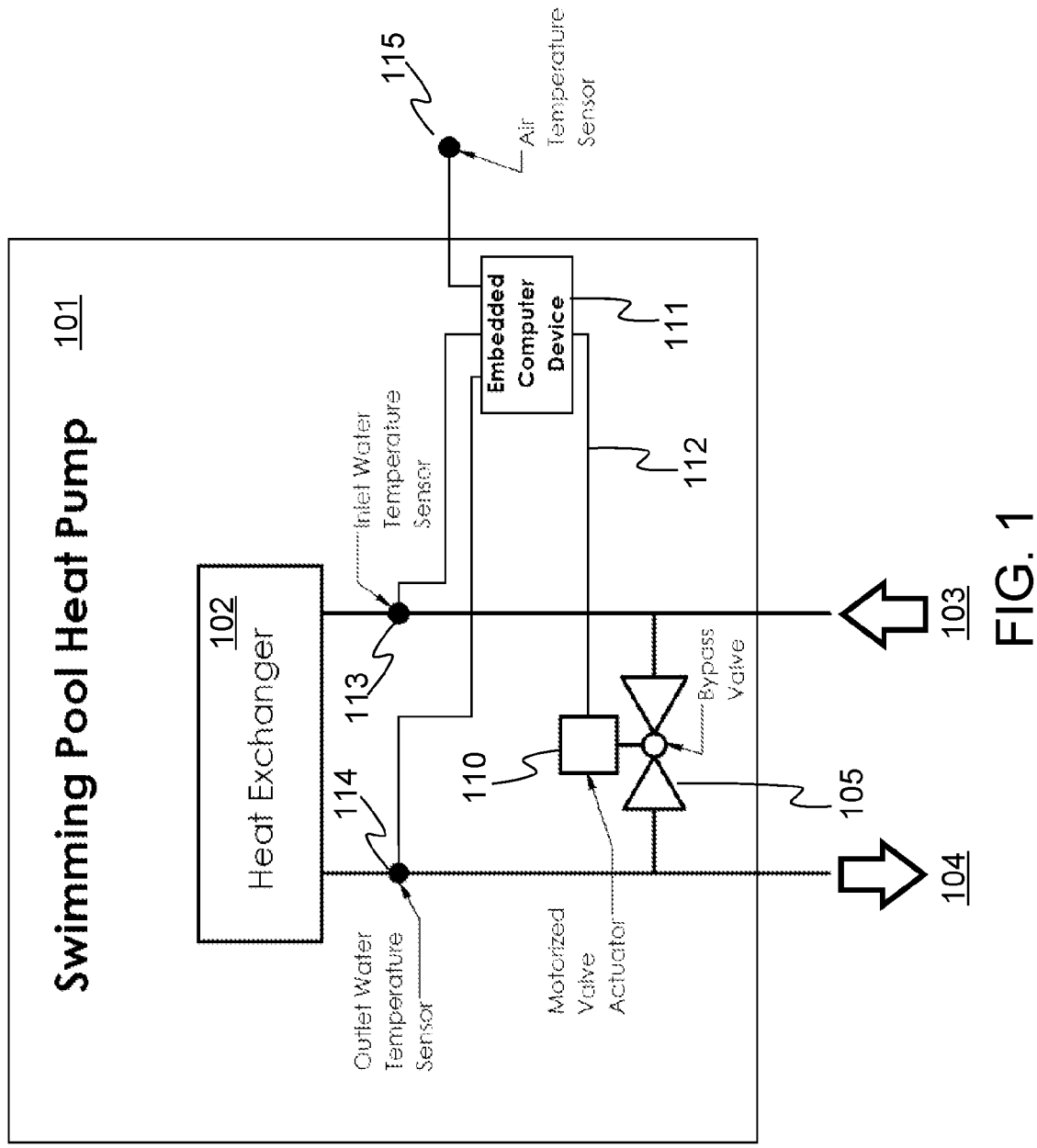
FIG. 1 depicts an arrangement of components according to at least one exemplary embodiment of the invention integrated into a swimming pool heat pump.

The present inventor(s) have recognized an unmet need in the art for a smarter, automated system and method to dynamically control a bypass valve for a heat pump, such as but not limited to a swimming pool heat pump. It is difficult, if not impossible, for a person to determine if a heat pump, circulating pump, and bypass valve are configured to provide optimal heat transfer from the heat pump while maintaining optimal flow rate through the circulating system, including in many case a filter.

Having recognized this need in the art, the present inventors have invented a device that automatically controls a position of a valve actuator, a thus, a bypass valve setting. In at least one embodiment according to the present invention, the improved automated bypass valve control system includes one or more temperature sensors for monitoring water and nearby ambient air temperatures, an embedded computer or suitable control logic ("controller"), a valve actuator, and a driver circuit for controlling the valve actuator electronically. According to this example embodiment, the controller periodically checks the various temperature sensor readings and calculates an optimal temperature change through the heat pump. If the measured temperature change through the heat pump falls outside of an allowable range, the controller commands the valve actuator to open or close the bypass valve to modulate the volume of water passing around the heat pump, and thereby correspondingly increase or decrease the amount of water flowing through the heat pump.

The present disclosure describes an example bypass control system that uses multiple inputs to control the flow rate of fluid into and around the heat pump. The example control cycle of the bypass controller is configured to optimize the flow rate of water through the heat pump when the temperature differential through the heat pump falls outside of the optimal range.

In at least one embodiment according to the present invention, the components of the bypass control system are contained within or integrated to a heat pump itself. In at least another embodiment according to the present invention, the components of the bypass control system are physically separate from a heat pump and may be installed onto existing heat pumps or provided as an optional upgrade kit to a heat pump. In yet another embodiment according to the present invention, the components of the improved system may be installed onto or provided as an optional upgrade kit to an existing bypass valve.

In other words, unlike traditional heat pump plumbing systems in which the flow rate of water through the heat pump varies based on the flow rate of the circulation pump, the example bypass control system of the present disclosure is configured to modulate the position of a bypass valve to maintain optimal water flow through the heat exchanger. Consequently, the heat pump thermal efficiency is maintained at its rated level by lowering the refrigerant pressure and temperature on the high side of the refrigerant circuit and increasing the mass flow rate of the refrigerant in the system. In addition, this reduced refrigerant pressure and temperature reduces the strain on the compressor assembly thereby increasing the life and reliability of the system. Furthermore, the bypass control system prevents an excess flow rate from increasing the stress and wear on the heat exchanger thereby increasing the life and reliability of the heat exchanger components. Further, bypassing excessive flow from the heat exchanger reduces the load on the circulation pump, thereby extending the life of the system as well.

The example embodiment of a bypass control assembly according to the present invention includes three temperature sensors: one for measuring the ambient air temperature near the swimming pool, one for measuring water temperature arriving into the heat pump system, and one for measuring water temperature exiting the heat pump system. The improved system also includes a motorized actuator for controlling a bypass valve, and a controller computing platform (or equivalent logic ciricuit). The controller may be realized as a standalone computer, as a firmware component of the heat pump system's internal controller, or as a firmware component in an overall automation system.

In general, the improved bypass valve controller functions by first measuring the temperature of the ambient air using the air temperature sensor. It then calculates the optimal temperature differential for the heat pump system between the water entering temperature and the water exiting temperature. If the measured values fall outside of the optimal range based on the ambient air temperature, the controller will issue commands to open or close the bypass valve to modulate the flow rate through or around the heat pump system. This process is repeated at regularly occurring intervals during operation to maintain consistent flow through the heat pump.

Example System Configuration. Referring now to FIG. 1, an arrangement 100 of components 101 according to at least one exemplary embodiment of the invention integrated into a swimming pool heat pump is shown. The improved swimming pool heat pump 101 includes a conventional heat exchanger 102, with temperature sensors configured to measure the temperature of the water entering 113 the heat exchanger and the temperature of the water exiting 114 the heat exchanger. An embedded controller 111, such as an added controller or such as a firmware module added to the existing controller, receives the temperature measurements from the water sensors 113 and 114 as well as from an ambient air temperature sensor 115 near the swimming pool. Additionally, a motorized valve actuator 110 is configured to control a bypass valve 105 under control 112 of the controller 111, according to a control process such as the general process discussed in the foregoing paragraphs or in particular such as the process discussed in the following paragraphs.

Figure 2:
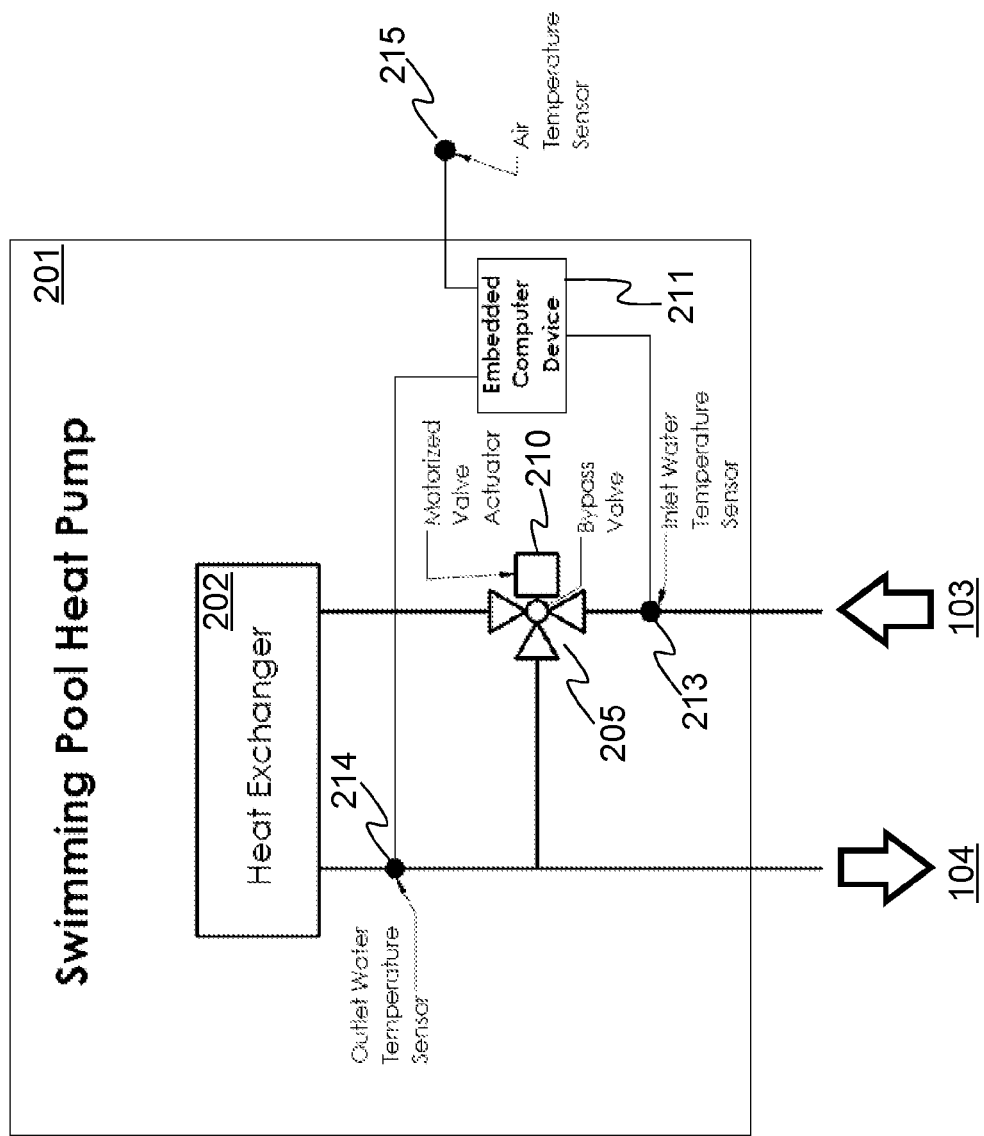
FIG. 2 illustrates an arrangement of components according to at least one exemplary embodiment of the invention integrated into a swimming pool heat pump utilizing a three-way valve.

Referring now to FIG. 2, an arrangement 200 of components 201 according to at least one exemplary embodiment of the invention integrated into a swimming pool heat pump is shown using a three-way 205 bypass valve. The improved swimming pool heat pump 201 includes a conventional heat exchanger 202, with temperature sensors configured to measure the temperature of the water entering 213 the heat exchanger and the temperature of the water exiting 214 the heat exchanger. An embedded controller 211, such as an added controller or such as a firmware module added to the existing controller, receives the temperature measurements from the water sensors 213 and 214 as well as from an ambient air temperature sensor 215 near the swimming pool. Additionally, a motorized valve actuator 210 is configured to control a three-way bypass valve 205 under control of the controller 211, according to a control process such as the general process discussed in the foregoing paragraphs or in particular such as the process discussed in the following paragraphs.

Figure 3:
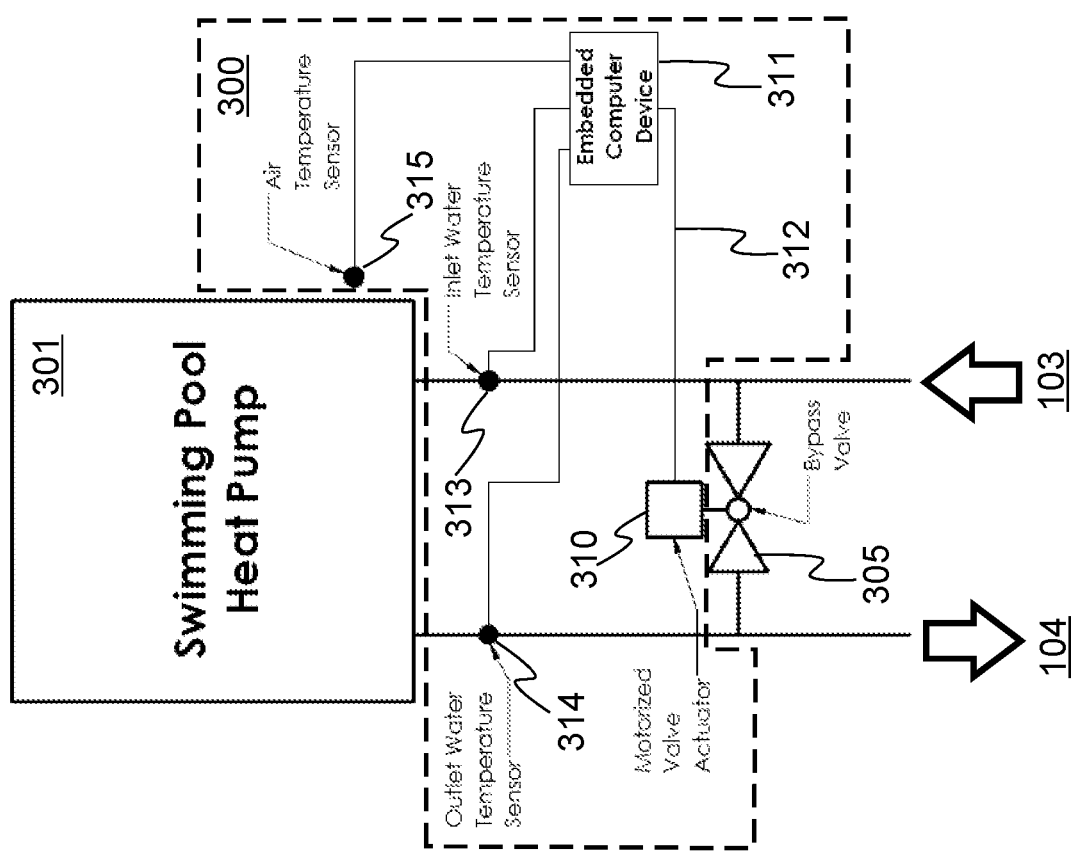
FIG. 3 sets forth an arrangement of components according to at least one exemplary embodiment of the invention as standalone device or upgrade kit to an existing swimming pool heat pump.

FIG. 3 sets forth an arrangement of components 300 according to at least one exemplary embodiment of the invention as standalone system or upgrade kit to an existing swimming pool heat pump 301. Temperature sensors 313, 314 are configured to measure the temperature of the water entering and exiting, respectively, the heat pump. An embedded controller 311 receives the temperature measurements from the water sensors 313 and 314 as well as from an ambient air temperature sensor 315 near the swimming pool. A motorized valve actuator 310 is configured to control a bypass valve 305 (or a three-way valve, not shown) by the controller 311, according to a control process such as the general process discussed in the foregoing paragraphs or in particular such as the process discussed in the following paragraphs.

Figure 4:
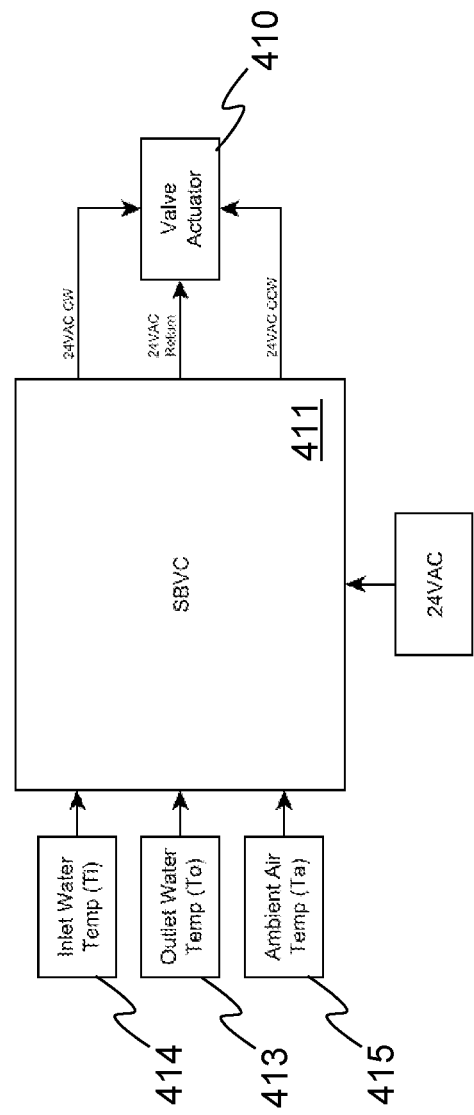
FIG. 4 provides an arrangement of components according to at least one exemplary embodiment of the invention for a stand-alone controller for realizing the benefits of the present invention utilizing separately-provided sensors and a valve actuator.

FIG. 4 shows a functional block diagram 400 of a standalone smart bypass valve controller 411 which can be utilized with a variety of water temperature sensors 413 and 414 and ambient air temperature sensors 415, with a valve actuator 410, in which the smart bypass valve controller 411 includes the process or method discussed in the foregoing paragraphs or in particular such as the process discussed in the following paragraphs. Please also note that FIG. 4 establishes some variable names for the temperature values received from the sensors, which are useful for reference in the following discussion regarding an example control process to be executed by any of the embedded controllers (or added firmware components) of the foregoing example embodiments.

Example Control Processes. In the first example control process, we will use several variables and constant names for reference to sensor input values, scalars, and controller output values, including:
(a) Heater inlet temperature = $T_i$;
(b) Heater outlet temperature = $T_o$;
(c) Ambient Temperature = $T_a$;
(d) Heater delta $dT_{heater} = (T_o - T_i)$ (the difference between the water temperature entering the heat exchanger or heat pump and the water temperature exiting the heat exchanger or heat pump)
(e) Target delta = $dT_{target}$ (the optimal value for $dT_{heater}$ for optimal heat pump operation);
(f) AHRI Rated capacity @ 80/50/63 = $Q_i$ (BTU/h);
(g) AHRI Rated capacity @ 80/80/63 = $Q_h$ (BTU/h).

In at least one embodiment according to the present invention, the controller firmware or suitable control logic performs the following control process on a periodic basis, such as in a control loop paced by a timer, as shown in Table 1.

TABLE 1

Example Generalized Pseudocode for a Realtime Bypass Valve Control Process

// initialize control scalars
$S_1 = 0.048$;
$S_2 = 0.6$;
// begin control loop
loop {
    // determine target temp increase based on realtime ambient temp
    $dT_{target} = (S_1 * T_a) + S_2$ TABLE 1-continued Example Generalized Pseudocode for a Realtime Bypass Valve Control Process

```
// determine realtime temperature increase across heat exchanger
dT_heater = T_o - T_i
// determine which way to move bypass valve
If ( dT_heater > dT_target )
    {
    Output = drive valve towards fully open for x milliseconds
    } //endif
    else
    {
        If ( dT_heater < dT_target )
        {
        Output: drive valve towards fully closed for x ms
        } // endif
        else
        {
            Output = no valve position change
        } // end else
    } // end else
Wait y seconds
} // end loop
```

In at least another embodiment according to the present invention, the controller firmware or suitable control logic performs the following control process on a periodic basis, such as in a control loop paced by a timer, for a specific swimming pool heat pump having specific BTU ratings, as shown in Table 2.

TABLE 2

Example Pseudocode for Realtime Control Process for a Specific Heat Pump with Specific BTU Ratings

```
// initialize scalars
m = (4.44 - (4.44 * Q_i/Q_h)) / 30
b = 4.44 - (80 * m)
// begin control loop
loop {
    // determine realtime target temp increase across heat exchanger
    // based on current ambient temperature
    dT_target = (m * T_a) + b
    // determine realtime temperature increase across heat exchanger
    dT_heater = T_o - T_i
    // determine which way to move bypass valve
    If ( dT_heater > dT_target )
        {
        Output = drive valve towards fully open for x ms
        } // end iff
        else
        {
            If ( dT_heater < dT_target )
            {
            Output: drive valve towards fully closed for x ms
            }// end if
            else
            {
                Output = no valve position change
            } // end else
        } // end else
Wait y seconds
} // end loop
```

Example components for such a system controlled by the pseudocode of Table 2 could be a:

(a) a TropiCal [TM] T90 pool heat pump available from AquaCal AutoPilot, Inc., of St. Petersburg, Florida (USA), which has an AHRI capacity 80/50/63 rating (ie., $Q_i$) of 65,000 BTU/h and an AHRI capacity 80/80/63 rating (ie., $Q_h$) of 90,000 BTU/h;

(b) a 24 volt Jandy [TM] JVA 2444 valve actuator available from Zodiac Pool Systems LLC of Carlsbad, California (USA);

(c) a suitable two- or three-way bypass valve compatible with the chosen valve actuator; and (d) a controller such as such as the microprocessor in the T90 heat pump, a PoolSync [TM] wireless pool equipment controller available from AquaCal AutoPilot, Inc., of St. Petersburg, Florida (USA), or an AquaLink [TM] RS Pool & Spa automation system available from Zodiac Pool Systems LLC of Carlsbad, California (USA).

Figure 5:
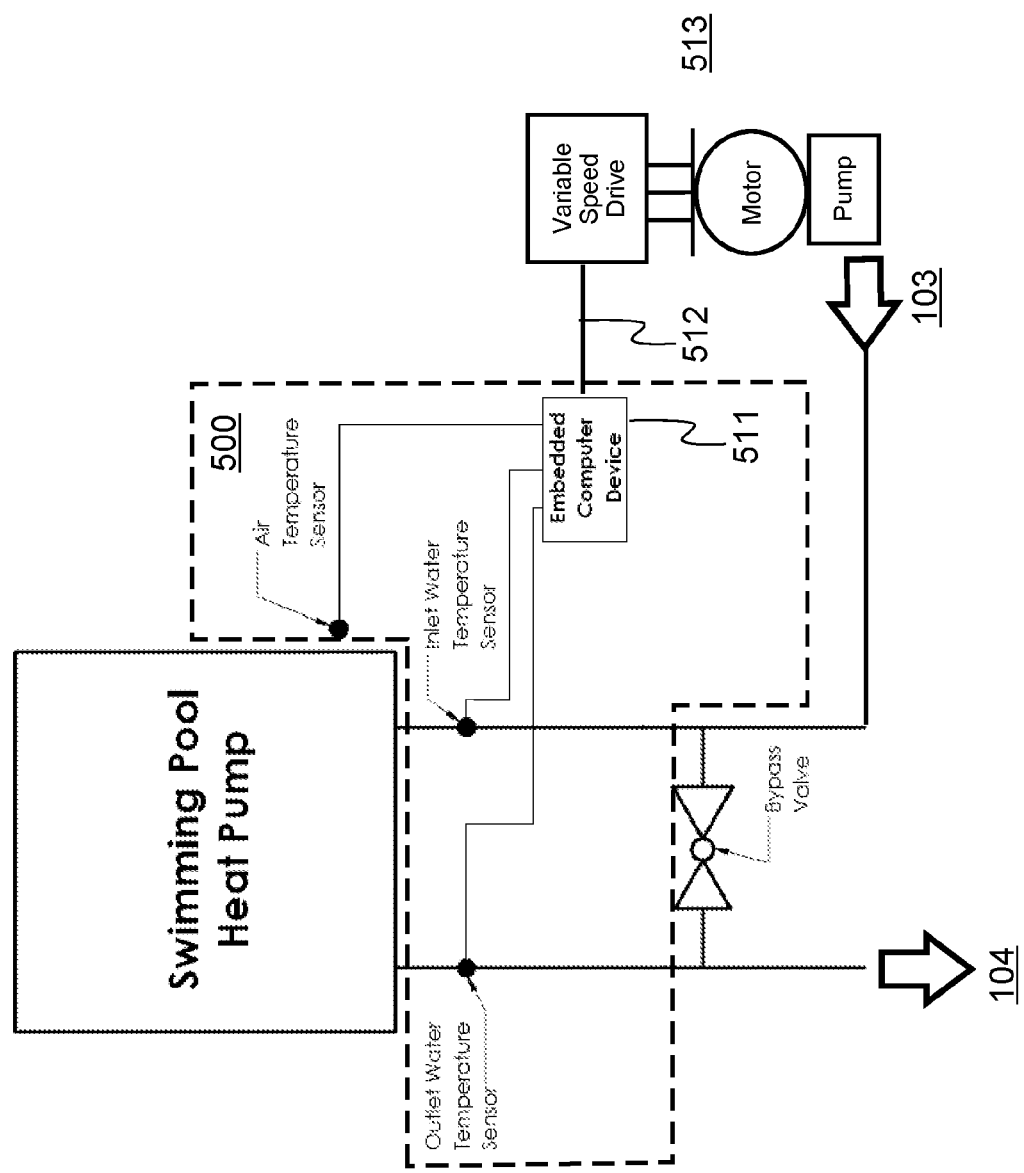
FIG. 5 illustrates an arrangement of components according to at least one exemplary embodiment of the invention in which a variable speed circulation pump is controlled in place of or in addition to a bypass valve.

In yet another embodiment according to the present invention, rather than controlling a bypass valve, the method is configured to control 512 a multispeed or variable speed pool circulation pump 513, as shown in the arrangement of components 500 in FIG. 5. In such an embodiment, when the temperature increase across the heat pump is below a target temperature increase (gain), the circulation pump speed is decreased to the water flow rate through the heat pump's heat exchanger in order to allow the water more time in the heat exchanger to absorb more heat. Conversely, when the temperature increase across the heat pump is above a target temperature increase, the circulation pump speed is increased to increase the water flow rate through the heat pump's heat exchanger. The generalized control process of Table 1 can be adapted to control circulation pump speed $V_{pump}$ as shown in Table 3.

TABLE 3

Example Generalized Pseudocode for a Realtime Circulation Pump Speed Control Process

```
// begin control loop
loop {
    // determine target temp increase based on realtime ambient temp
    dT_target = (S_3*T_a) + S_4
    // determine realtime temperature increase across heat exchanger
    dT_heater = T_o - T_i
    // determine how to adjust circulation pump speed
    If ( dT_heater > dT_target )
        {
            Output = V_pump++ // increase circulation pump speed
        } // end if
        else
        {If ( dT_heater < dT_target )
            {
            Output = V_pump - - // decrease circulation pump speed
            } // end if
            else
            {
            V_pump=V_pump // no circulation pump speed change
            } // end else
        } // end else
Wait y seconds
} // end of control loop
```

In still other embodiments, a combination of controlling a bypass valve position and a speed of a circulation pump can be combined in a control process for even greater control and accuracy.

Figure 6:
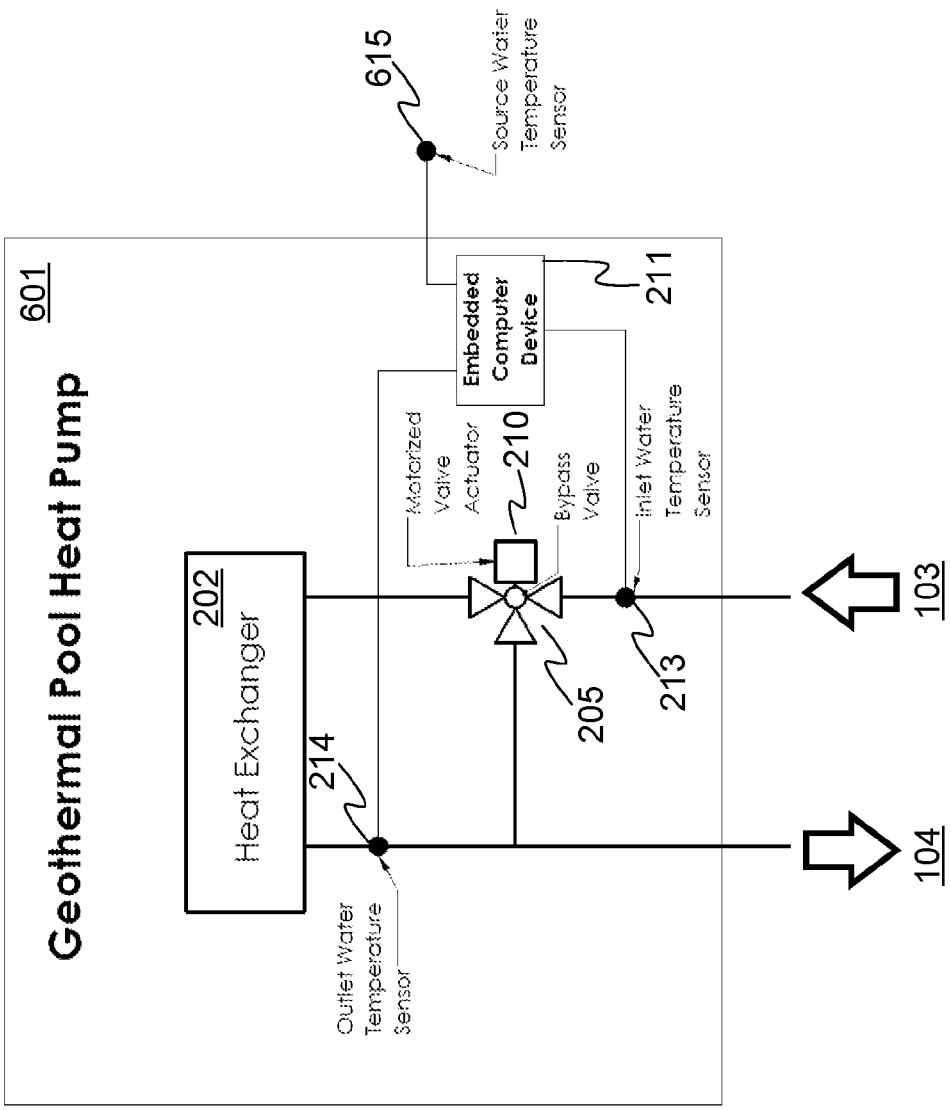
FIG. 6 illustrates another arrangement of components according to at least one other exemplary embodiment of the invention integrated into a geothermal swimming pool heat pump utilizing a three-way valve.

Referring now to FIG. 6, another arrangement 600 of components 601 according to at least one additional exemplary embodiment of the invention integrated into a geothermal swimming pool heat pump is shown, also using a three-way 205 bypass valve, as shown in FIG. 2. However, in this embodiment, a sensor 615 for the source water temperature is used in place of (or in addition to) the ambient air temperature sensor 215. The example pseudocode in the foregoing tables would be revised accordingly to use the source water temperature measurement in place of (or in conjunction with) the ambient air temperature measurement.

Example Computing Hardware. The "hardware" portion of a computing platform, such as an embedded controller, typically includes one or more microprocessors accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces may be provided, as well as specialty interfaces for specific applications. If the computing platform is intended to interact with human users, it is provided with one or more user interface devices, such as display(s), keyboards, pointing devices, speakers, etc. And, each computing platform requires one or more power supplies (battery, AC mains, solar, etc.).

Conclusion. The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Certain embodiments utilizing a microprocessor executing a logical process may also be realized through customized electronic circuitry performing the same logical process(es). The foregoing example embodiments do not define the extent or scope of the present invention, but instead are provided as illustrations of how to make and use at least one embodiment of the invention.

What is claimed is:

1. A method for controlling a flow rate through a swimming pool heat pump comprising:
   receiving, by an electronic control circuit, a least three electronic temperature measurements comprising:
      a first temperature measurement taken at a water input to a specific swimming pool heat pump, wherein the heat pump comprises a heat transfer device employing a refrigeration cycle;
      a second temperature measurement taken at a water output from the swimming pool heat pump; and
      a third temperature measurement taken in real-time of ambient conditions near a swimming pool associated with the swimming pool heat pump, or taken in real-time at a geothermal pool heat pump source water, or both;
   determining, by an electronic control circuit, a target heat increase value across the swimming pool heat pump as an optimizing heat transfer function of at least three criteria including the third temperature measurement, a high capacity rating for the specific swimming pool heat pump, and a low capacity rating for the specific swimming pool heat pump;
   determining, by an electronic control circuit, a realtime water temperature increase as a difference between the first temperature measurement and the second temperature measurement; and
   responsive to comparing the realtime water temperature increase and the target heat increase value, commanding, by an electronic circuit, a swimming pool circulation flow control component to increase swimming pool water flow rate, decrease swimming pool water flow rate, or maintain swimming pool water flow rate through the swimming pool heat pump to adjust an amount of heat transferred to swimming pool water flowing through the swimming pool heat pump.

2. The method as set forth in claim 1 wherein the flow control component comprises a bypass valve, wherein the commanding comprises applying a control voltage having a polarity to a motorized bypass valve actuator for a determined period of time to further open, further close or maintain a position of the bypass valve, and wherein the bypass valve allows water to flow to the swimming pool without flowing through the swimming pool heat pump when open.

3. The method as set forth in claim 1 wherein the flow control component comprises a bypass valve, wherein the commanding comprises applying a control voltage having a determined magnitude to a variable speed circulation pump to further increase, further decrease, or maintain a speed of the circulation pump, and wherein the bypass valve allows water to flow to the swimming pool without flowing through the swimming pool heat pump when open.

4. The method as set forth in claim 1 wherein the electronic control circuit comprises a microprocessor.

5. The method as set forth in claim 4 wherein the microprocessor comprises an embedded controller within the swimming pool heat pump.

6. The method as set forth in claim 4 wherein the microprocessor comprises an embedded controller external to the swimming pool heat pump.

7. A computer program product for controlling a flow rate through a swimming pool heat pump comprising:
   a tangible, computer readable memory which is not a propagating signal per se; and computer instructions encoded by the tangible, computer readable memory, which,
   when executed by a computer, cause the computer to perform steps comprising:
      receiving a least three electronic temperature measurements comprising:
         a first temperature measurement taken at a water input to a swimming pool heat pump, wherein the heat pump comprises a heat transfer device employing a refrigeration cycle;
         a second temperature measurement taken at a water output from the swimming pool heat pump; and
         a third temperature measurement taken in real-time of ambient conditions near a swimming pool associated with the swimming pool heat pump, or taken in real-time at a geothermal pool heat pump source water, or both;

determining a target heat increase value across the swimming pool heat pump as an optimizing heat transfer function of at least three criteria including the third temperature measurement, a high capacity rating for the specific swimming pool heat pump, and a low capacity rating for the specific swimming pool heat pump;

determining a realtime water temperature increase as a difference between the first temperature measurement and the second temperature measurement; and responsive to comparing the realtime water temperature increase and the target heat increase value, commanding a swimming pool circulation flow control component to increase swimming pool water flow rate, decrease swimming pool water flow rate, or maintain swimming pool water flow rate through the swimming pool heat pump to adjust an amount of heat transferred to swimming pool water flowing through the swimming pool heat pump.

8. The computer program product as set forth in claim 7 wherein the flow control component comprises a bypass valve, wherein the commanding comprises applying a control voltage having a polarity to a motorized bypass valve actuator for a determined period of time to further open, further close or maintain a position of the bypass valve, and wherein the bypass valve allows water to flow to the swimming pool without flowing through the swimming pool heat pump when open.

9. The computer program product as set forth in claim 7 wherein the flow control component comprises a bypass valve, and wherein the commanding comprises applying a control voltage having a determined magnitude to a variable speed circulation pump to further increase, further decrease, or maintain a speed of the circulation pump, and wherein the bypass valve allows water to flow to the swimming pool without flowing through the swimming pool heat pump when open.

10. The computer program product as set forth in claim 7 wherein the computer comprises a microprocessor.

11. The computer program product as set forth in claim 10 wherein the microprocessor comprises an embedded controller within the swimming pool heat pump.

12. The computer program product as set forth in claim 10 wherein the microprocessor comprises an embedded controller external to the swimming pool heat pump.

13. A system for controlling a flow rate through a swimming pool heat pump comprising:
    a computer processor;
    a tangible, computer readable memory which is not a propagating signal per se; and computer instructions encoded by the tangible, computer readable memory, which,
        when executed by the computer processor, cause the computer processor to perform steps comprising:
            receiving a least three electronic temperature measurements comprising:
                a first temperature measurement taken at a water input to a swimming pool heat pump, wherein the heat pump comprises a heat transfer device employing a refrigeration cycle;
                a second temperature measurement taken at a water output from the swimming pool heat pump; and
                a third temperature measurement taken in real-time of ambient conditions near a swimming pool associated with the swimming pool heat pump, or taken in real-time at a geothermal pool heat pump source water, or both;
            determining a target heat increase value across the swimming pool heat pump as an optimizing heat transfer function of at least three criteria including the third temperature measurement, a high capacity rating for the specific swimming pool heat pump, and a low capacity rating for the specific swimming pool heat pump;
            determining a realtime water temperature increase as a difference between the first temperature measurement and the second temperature measurement; and
            responsive to comparing the realtime water temperature increase and the target heat increase value, commanding a swimming pool circulation flow control component to increase swimming pool water flow rate, decrease swimming pool water flow rate, or maintain swimming pool water flow rate through the swimming pool heat pump to adjust an amount of heat transferred to swimming pool water flowing through the swimming pool heat pump.

14. The system as set forth in claim 13 wherein the flow control component comprises a bypass valve, wherein the commanding comprises applying a control voltage having a polarity to a motorized bypass valve actuator for a determined period of time to further open, further close or maintain a position of the bypass valve, and wherein the bypass valve allows water to flow to the swimming pool without flowing through the swimming pool heat pump when open.

15. The system as set forth in claim 13 wherein the flow control component comprises a bypass valve, wherein the commanding comprises applying a control voltage having a determined magnitude to a variable speed circulation pump to further increase, further decrease, or maintain a speed of the circulation pump, and wherein the bypass valve allows water to flow to the swimming pool without flowing through the swimming pool heat pump when open.

16. The system as set forth in claim 13 wherein the computer processor comprises an embedded controller within the swimming pool heat pump.

17. The system as set forth in claim 13 wherein the computer processor comprises an embedded controller external to the swimming pool heat pump.

* * * * *